G. L. JACQUES.
POWER TRANSMISSION.
APPLICATION FILED FEB. 1, 1919.

1,336,747.

Patented Apr. 13, 1920.
5 SHEETS—SHEET 1.

Inventor.
G. L. Jacques,
By Munn & Co.
Att'ys

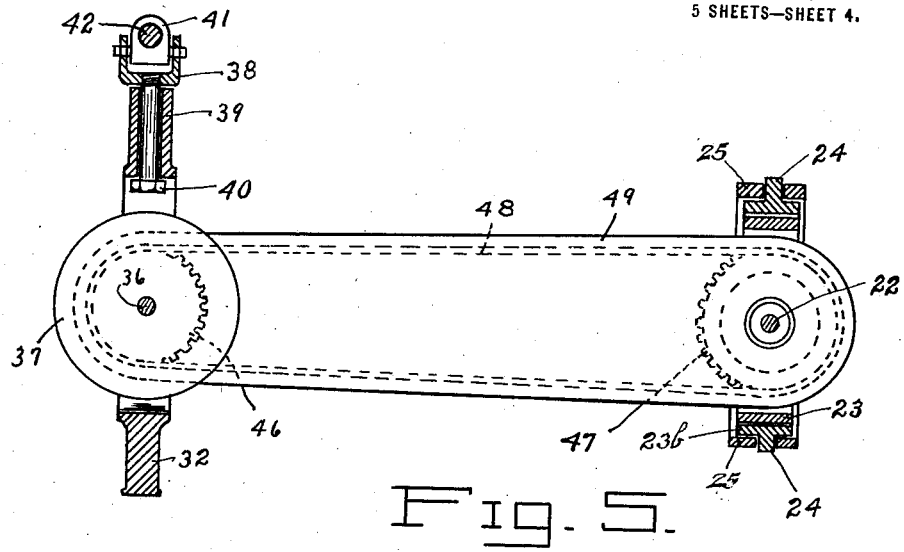
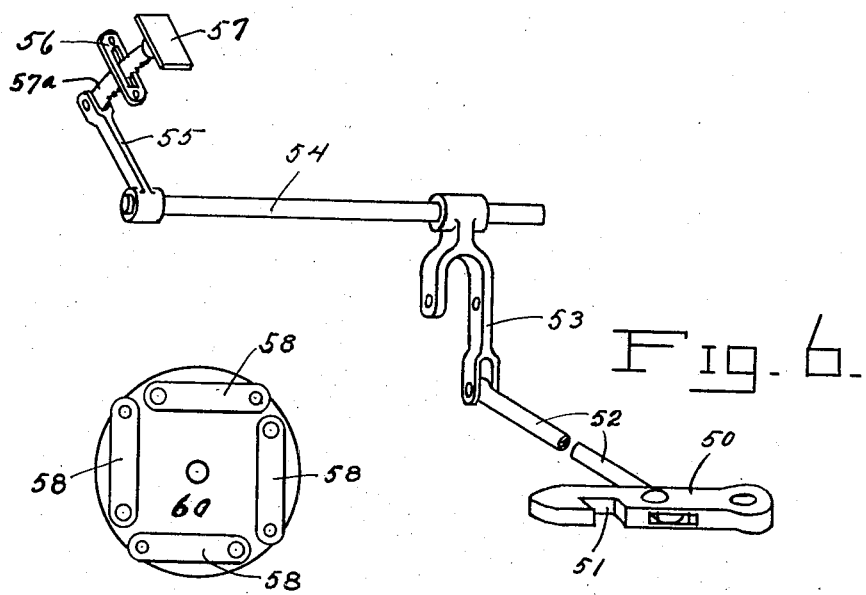
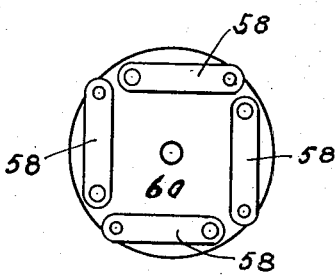

G. L. JACQUES.
POWER TRANSMISSION.
APPLICATION FILED FEB. 1, 1919.

1,336,747.

Patented Apr. 13, 1920.
5 SHEETS—SHEET 5.

Inventor.
G. L. Jacques,

UNITED STATES PATENT OFFICE.

GEORGE L. JACQUES, OF NEILLSVILLE, WISCONSIN.

POWER TRANSMISSION.

1,336,747.     Specification of Letters Patent.     Patented Apr. 13, 1920.

Application filed February 1, 1919. Serial No. 274,467.

*To all whom it may concern:*

Be it known that I, GEORGE L. JACQUES, a citizen of the United States, and a resident of Neillsville, in the county of Clark and State of Wisconsin, have made certain new and useful Improvements in Power Transmission, of which the following is a specification.

My present invention relates generally to transmission of power, and more particularly to a power transmission for motor vehicles, my primary object being the provision of a power transmission which will enable the changing of speeds without breaking the power connection between the motor and the drive wheels.

A further object of my invention is the provision of a friction power transmission in which greater bearing is provided for and maintained between the driving and driven friction members than is had with the known constructions.

Other objects and the resulting advantages will appear in the course of the following description of my invention, reference being had to the accompanying drawings forming a part of this specification, and wherein:

Fig. 5 is a detail sectional view showing drive chain by dotted lines and chain housing;

Fig. 6 is a detail perspective view of the reverse locking device;

Fig. 7 is a face view of the disk of the power shaft;

Figure 1:
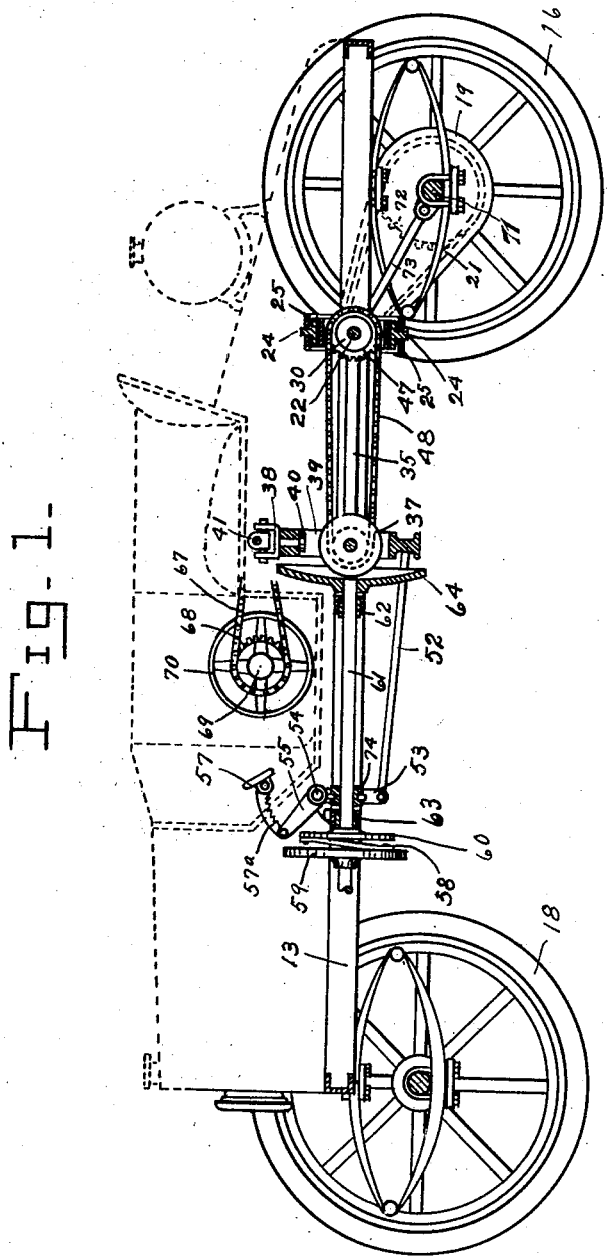
Figure 1 is a sectional side elevation of the chassis or motor vehicle, showing my improvements.
Figure 2:
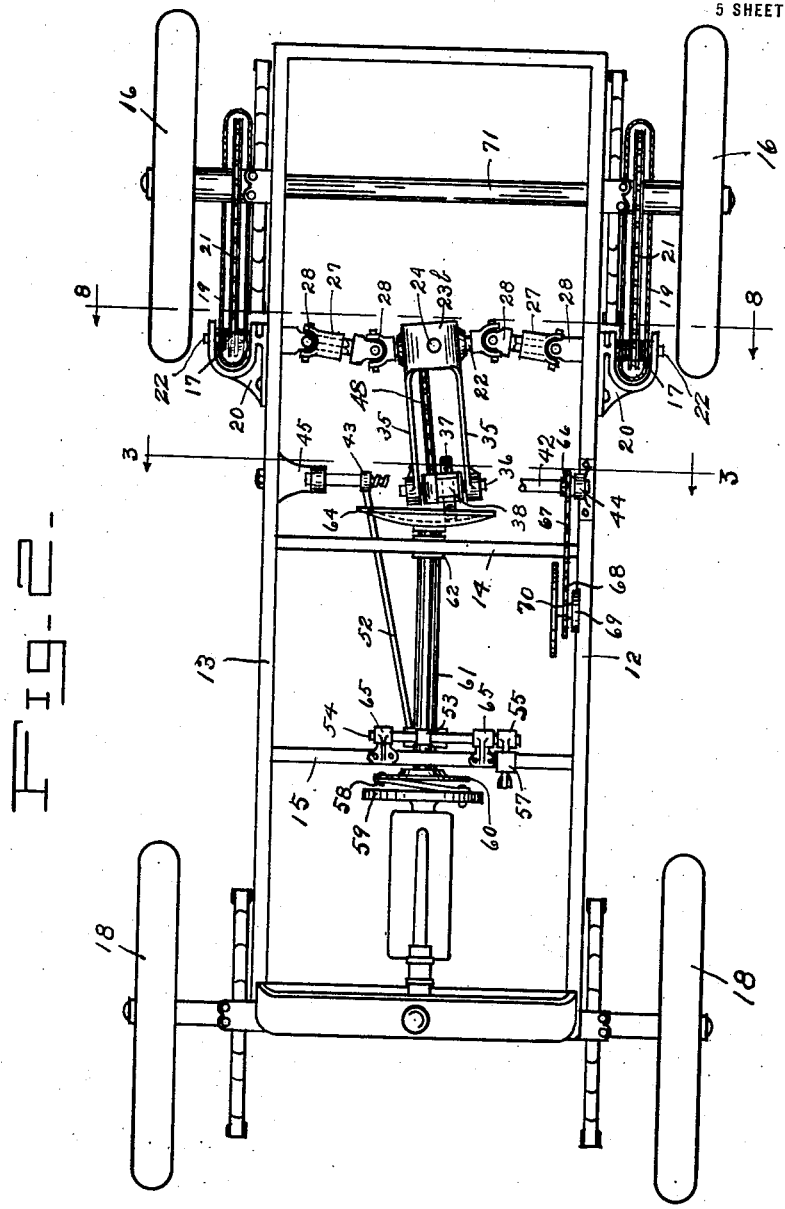
Fig. 2 is a top plan view showing flexible shaft, drive chains from flexible shaft to drive wheels, driving disk, propeller shaft and connections to motor.

Referring now to these figures, I have in Figs. 1 and 2 in particular, illustrated the chassis of a motor vehicle which includes a frame having side bars 12 and 13 and the usual rear and front wheels 16 and 18, the rear wheels 16 being the driving wheels and being rotatably mounted upon the outer ends of a rear axle 71, each wheel having a sprocket wheel 72 connected by a sprocket chain 21, with a sprocket wheel 17 mounted upon the respective outer section of the rear transverse and flexible jack shaft 22, said outer sections of the said jack shaft being journaled through the bearing brackets 20 which are fastened to the longitudinal sides 12 and 13 of the chassis. See Fig. 8.

The chains 21 extend at opposite sides of the frame beyond side bars 12 and 13, and within casings 19, which protect the same, the rear portions of the casings 19 being provided with journals for the wheel hubs and the forward upper portions thereof being pivotally supported in the bearing brackets 20 mounted upon the sides 12 and 13 as before stated.

Figure 8:
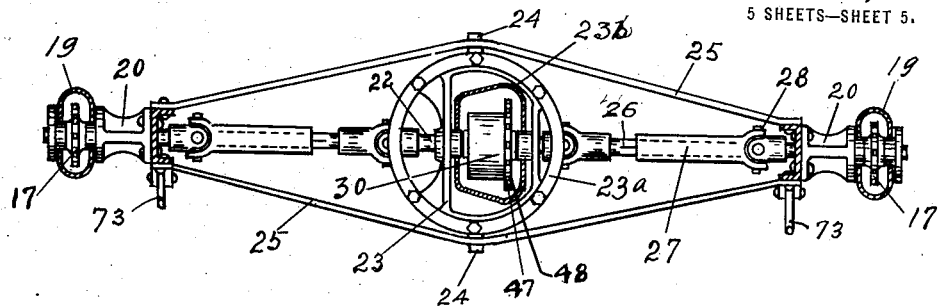
Fig. 8 is a vertical section taken on line 8—8 of Fig. 2 showing universal joints of flexible shaft, driven sprocket and differential and casing.
Figures 9, 10:
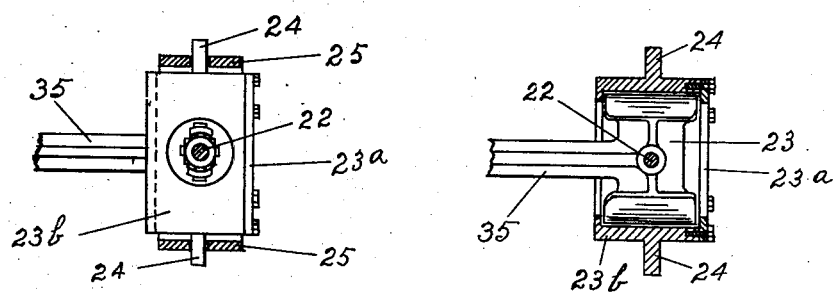
Fig. 9 is a detail showing casing and pivots.
Fig. 10 is a sectional detail showing side arm and shaft bearing in casing.
Figure 11:
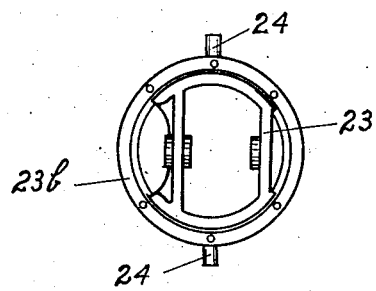
Fig. 11 is a detail showing shaft bearing in casing and pivots.

The rear axle 71 is braced by radius rods 73 which are pivoted at their rear ends to the axle 71 and at their forward ends to the lower edge of the side bars 12 and 13 as seen in Figs. 1 and 8.

A driven sprocket 47 is secured to the differential housing 30 of the jack shaft 22 which shaft is journaled through a centrally located bearing 23, said bearing being movably fitted into a casing 23$^b$ having a cover 23$^a$ and which is pivoted by its vertical trunnions 24 through the trusses 25 which are fastened at their ends to the frame sides 12 and 13. The shaft 22 includes slip joints at opposite sides of the casing 23$^b$, each consisting of a universal joint 28, and a squared extension 26 slidably interfitting a sleeve 27 having a squared bore.

The shaft bearing casing 23$^b$ is provided with arms 35 extending forwardly and having a shaft 36 journaled transversely through the extreme forward ends thereof and the sprocket 47 is connected by a chain 48 to a sprocket wheel 46 which is rigidly mounted on said shaft 36, as best seen in Fig. 5. A friction wheel 37 is also rigidly mounted on said shaft 36 as seen in Fig. 2, and the chain 48 is preferably protected by a housing 49 as seen in Figs. 3 and 5, said housing having journals for the hubs of sprocket 46 and shaft bearing 23.

Figure 3:
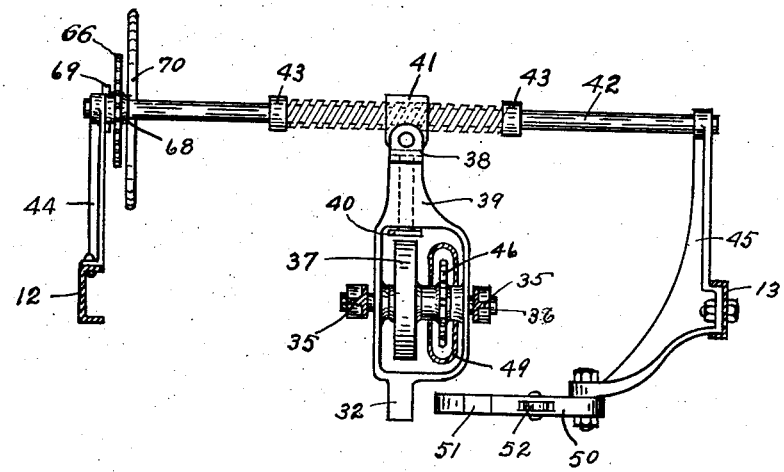
Fig. 3 is a vertical section taken on line 3—3 of Fig. 2 showing speed changing shaft, lead block, friction wheel and frame also drive sprocket.

A rectangular frame 39 is journaled on the shaft 36 between the arms 35, as best seen in Fig. 3, said frame 39 being fastened to a clevis 38 by a king bolt 40. This rectangular frame 39 is provided with a depending lug 32 and the clevis 38 is pivoted to a lead block 41 which is mounted on and engages a threaded central section of the speed changing shaft 42, provided with collars 43 forming limits of movement of the lead block 41. Shaft 42 is journaled through brackets 44 and 45 which are fastened to and upstand from the sides 12 and 13.

At one end of shaft 42 is a sprocket 66 connected by a chain 67 to a sprocket 68, said latter sprocket being fastened to a hand wheel 70, loosely journaled on a stub shaft 69 which may be fastened to one inner side of the body of the vehicle, as seen in Figs. 1, 2 and 3.

Figure 4:
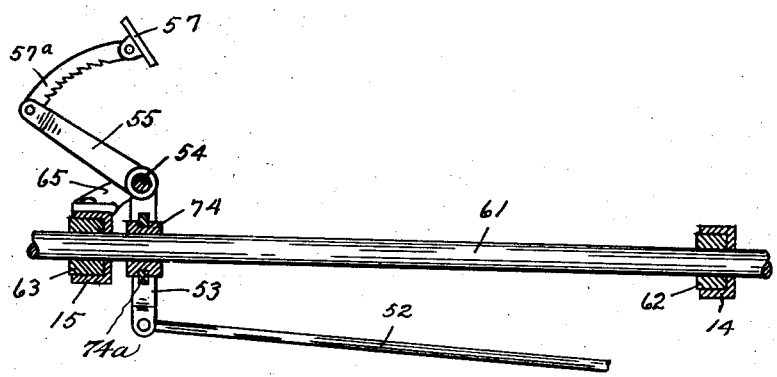
Fig. 4 is a sectional view of foot pedal shift collar and propeller shaft bearings.

The bracket 45 which is fastened to the side 13, as seen in Fig. 3, extends down below the frame and curves toward the friction wheel 37 and a latch member or lock bar 50 is pivoted to said lower portion of bracket 45 and is provided with a notch 51 for engaging the lug 32. To this lock bar 50 is pivoted the rear end of a connecting rod 52 which extends forwardly and is pivoted to a shifting fork 53 secured to and depending from a shaft 54 as seen in Fig. 4. Shaft 54 is loosely journaled in brackets 65 said brackets being fastened to a crossbar 15, and carries a rigid arm 55 at one end, said arm 55 extending upwardly and forwardly and pivotally connected to a ratchet arm 57ᵃ carrying a foot pedal 57.

A concave friction driving disk 64 is rigidly mounted on the extreme rear end of the propeller shaft 61 which is journaled in the bearing 63 of the crossbar 15 and the bearing 62 of the crossbar 14 and has a disk 60 rigidly mounted on its extreme forward end, said disk 60 being coupled to the fly wheel 59 by the links 58. A collar 74 is rigidly mounted on the shaft 61 as seen in Fig. 4 and has a yoke 74ᵃ pivoted to the shifter fork 53 for a purpose to be now described.

In operation, the propeller shaft 61 carrying the driving disk 64 is brought back and in contact with the friction wheel 37 by depressing the foot pedal 57. Shaft 36 carrying the sprocket wheel 46 is thus rotated and such rotation transmitted to the driven sprocket 47 by the chain 48, so as to drive the flexible shaft 22 carrying the sprockets 17 by means of which the sprockets 72 on the drive wheels 16 are rotated through the chains 21.

When the friction wheel 37 is adjacent the outer edge of the driving disk 64 the vehicle is then at its highest speed. By turning the hand wheel 70 in a forward direction rotation is imparted to the speed changing shaft 42 through the sprockets 66 and 68 causing said speed changing shaft 42 to turn and shift the lead block 41 toward the center thereby tilting the rectangular frame 39 carrying the friction wheel 37, causing said friction wheel 37, by force of the driving disk 64 to climb toward the center of the disk until the friction wheel is directly under the lead block 41. To gain a higher speed again the hand wheel 70 is turned rearwardly toward the operator causing the speed changing shaft 42 to turn in the opposite direction and thereby pulling the lead block 41 toward the outer edge of the driving disk 64, when the friction wheel 37 will immediately climb to the outer edge of the driving disk 64 when it is again in its high speed.

To reverse, the foot pedal 57 is released which lets the driving disk move forward thereby disengaging the driving disk 64 from the friction wheel 37. The hand wheel 70 is then turned forward until the lead block 41 has carried the friction wheel 37 past the center of the driving disk 64 when the foot pedal is again pressed down where it is locked and held in place by the floor plate 56, see Fig. 6. The shifting fork 53 pushes the shaft 61 carrying the driving disk 64 back toward the friction wheel 37 until they are again in contact and the notch in the lock bar 50 now engages the depending lug 32 holding the rectangular frame 39 in a locked position, until it is again released when it is desired to again place the vehicle in forward motion.

I claim:—

1. A transmission for motor vehicles including a jack shaft in flexibly connected sections, a pivoted frame in which a section of said jack shaft is journaled, having a friction wheel, a sprocket chain connection between the friction wheel and the said section of the jack shaft, a speed changing shaft, connections between the speed changing shaft and said frame for swinging the latter on its pivot to move the friction wheel, a motor, having a driving shaft, a propeller shaft having a longitudinally yielding connection with the drive shaft, and a concave driving disk mounted on said propeller shaft and engaged by the friction wheel of said frame.

2. A transmission for motor vehicles comprising the combination with a motor having a drive shaft, a propeller shaft having a longitudinally yielding connection with the drive shaft, a concave friction member secured upon said propeller shaft, a frame pivoted at one end in the longitudinal plane of said shaft at a point removed therefrom, and having a friction wheel journaled therein and in engagement with the concave driving disk of the longitudinally movable propeller shaft, means for shifting said propeller shaft to engage and disengage the driving disk and friction wheel, and a jack shaft in flexibly connected sections of which certain of the sections have connection with said frame and are connected by sprockets and chain to the friction wheel thereof.

3. A transmission for motor vehicles comprising a frame pivoted at one end to swing in a horizontal plane and having a friction wheel journaled in the opposite end thereof, adjusting connections engaging the free end of the frame to swing the latter on its pivot, a shaft having a concave driving disk at one end movably engaged by the friction wheel of the frame, and releasable means to normally limit movement of the frame at one side of the center of the said concave driving disk.

4. A transmission for motor vehicles comprising a frame pivoted at one end to swing in a horizontal plane and having a friction wheel journaled in the opposite end thereof, adjusting connections engaging the free end of the frame to swing the latter on its pivot, a shaft having a concave driving disk at one end movably engaged by the friction wheel of the frame, means to normally limit movement of the frame at one side of the center of said concave driving disk, and means for simultaneously releasing said first named means and shifting the said propeller shaft longitudinally to separate the concave driving disk and friction wheel.

5. A transmission for motor vehicles comprising the combination with a motor having a drive shaft, a propeller shaft longitudinally alined with the drive and having a longitudinally shiftable connection therewith, a concave driving disk carried by said propeller shaft, a frame mounted to swing in a horizontal plane and having a friction wheel at one end movably engaging the said concave driving disk, connections engaging the said friction wheel supporting end of the frame for moving the frame, and a shaft in flexibly connected sections of which certain of the sections are journaled through the opposite end of the frame and have sprocket and chain connections with the friction wheel of the frame.

6. In a power transmission for motor vehicles, the combination of a drive shaft having a concave friction driving disk, a supporting member pivoted at one end at a point forming the center of the arc of curvature of said concave disk, and having a friction wheel journaled in its free end and engaging the concave friction disk, adjusting means engaging the said pivoted member at its free end for shifting the same on its pivot, and a jack shaft in jointed sections, certain of which are journaled through the pivoted end of the said member and have geared connections with the friction wheel.

GEORGE L. JACQUES.

Witnesses:
 VIOLET M. JACKSON,
 JEFFERSON F. SCHUSTER.